March 12, 1946.   F. H. HOPKINS   2,396,574

METHOD AND MEANS FOR RELIEVING FLUID PRESSURE

Filed Jan. 8, 1943   3 Sheets-Sheet 1

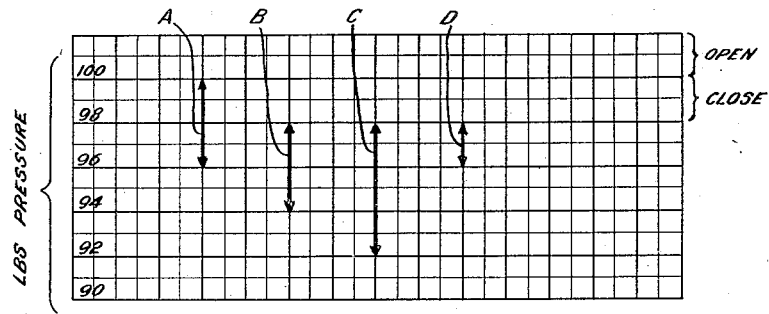

A — REPRESENTS THE INDEPENDENT OPENING AND CLOSING PRESSURE OF MAIN VALVE
B — REPRESENTS THE INDEPENDENT OPENING AND CLOSING PRESSURE OF PILOT VALVE
C — REPRESENTS THE STATIC PRESSURE DROP AT PILOT VALVE INLET
D — REPRESENTS THE RESULTING OPENING AND CLOSING OF THE COMBINATION MAIN AND PILOT VALVES

Fig. 1

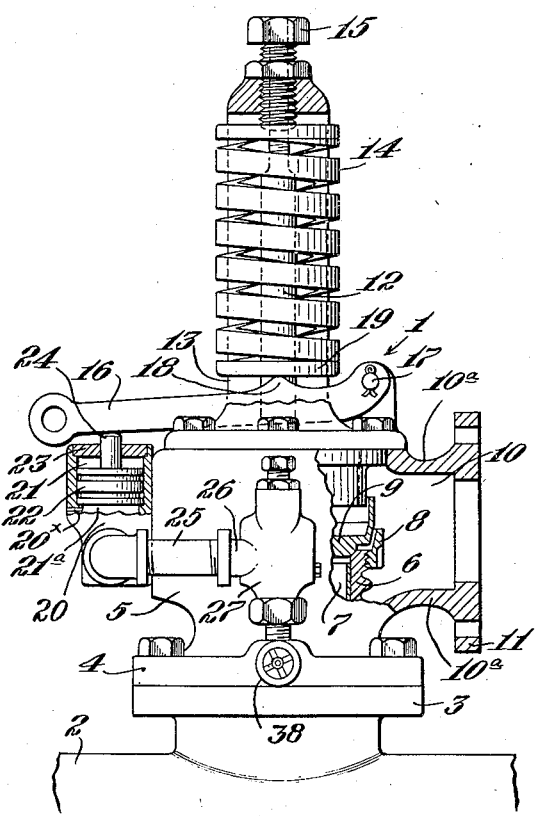

Fig. 2

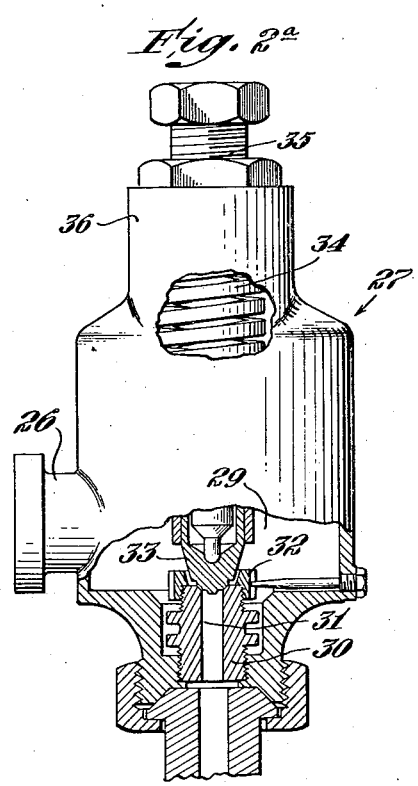

Fig. 2a

Inventor
Frank H. Hopkins
by Roberts Cushman & Woodberry
att'ys.

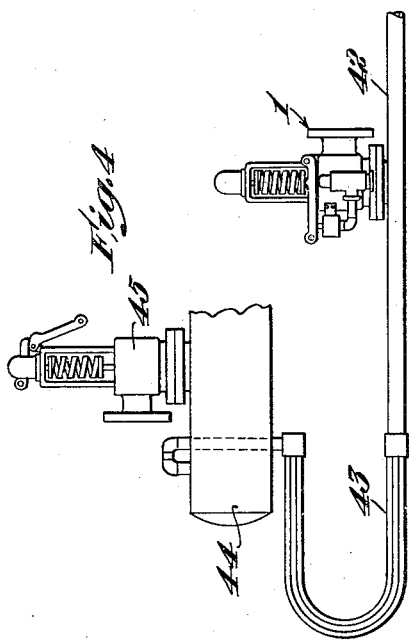
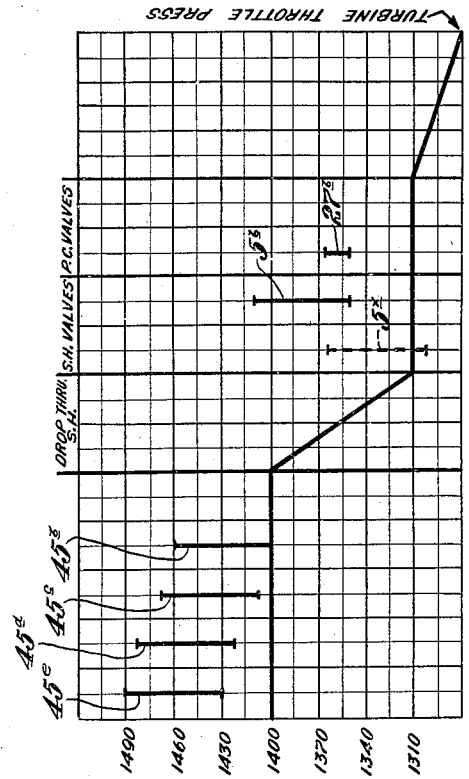
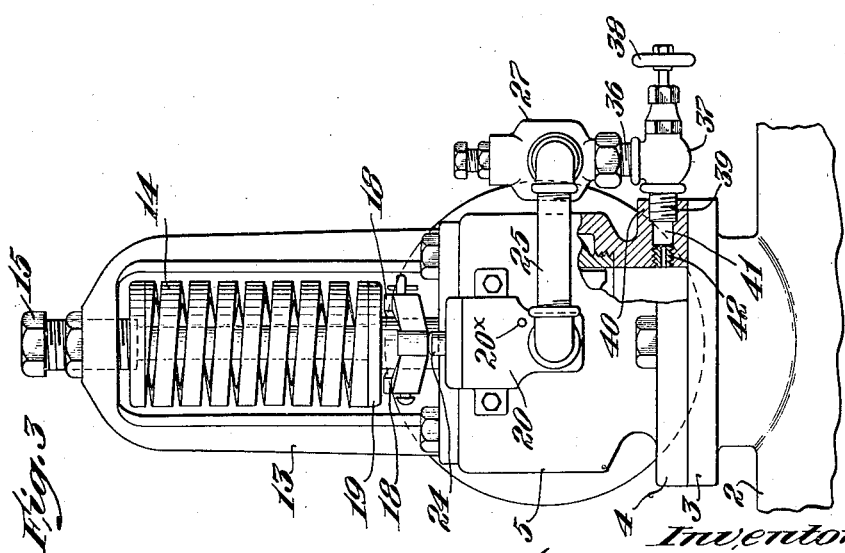

March 12, 1946.  F. H. HOPKINS  2,396,574
METHOD AND MEANS FOR RELIEVING FLUID PRESSURE
Filed Jan. 8, 1943  3 Sheets-Sheet 3
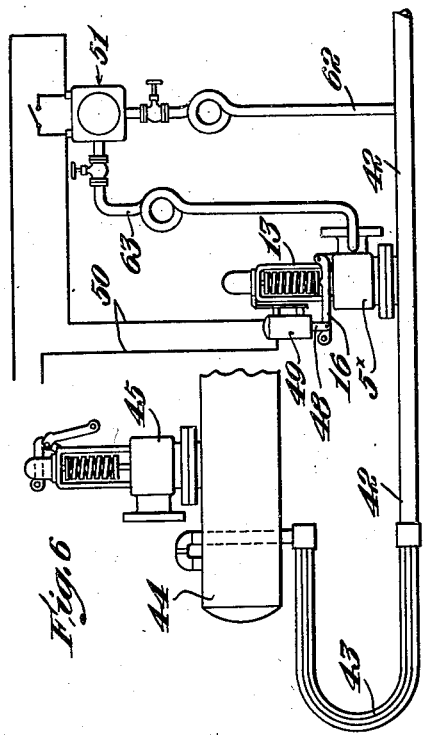
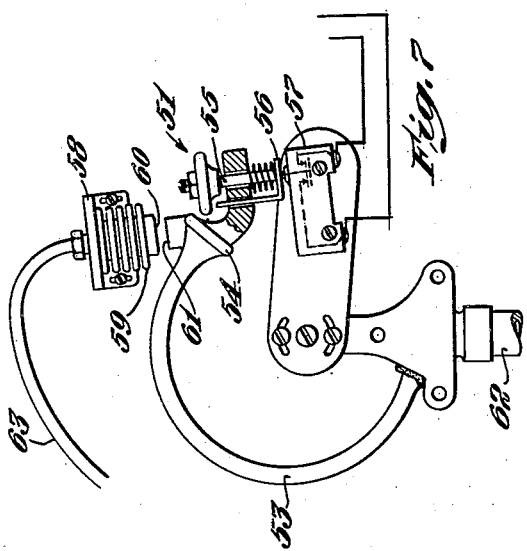
Inventor
Frank H. Hopkins
by Roberts Cushman & Woodberry
Attys.

Patented Mar. 12, 1946

2,396,574

UNITED STATES PATENT OFFICE 2,396,574

METHOD AND MEANS FOR RELIEVING FLUID PRESSURE

Frank H. Hopkins, Fairfield, Conn., assignor to Manning, Maxwell & Moore, Inc., New York, N. Y., a corporation of New Jersey Application January 8, 1943, Serial No. 471,699

17 Claims. (Cl. 137—53)

This invention pertains to a novel method of and means for automatically controlling the relief of excessive fluid pressure in steam generating apparatus, oil stills, etc. Customarily containers for fluid at high pressure are provided with safety valves which automatically open in response to excessive rise in pressure in the container and thus permit pressure fluid to escape until the pressure has been reduced.

In accordance with regulations promulgated by the American Society of Mechanical Engineers, all safety valves (rated as a part of the required pressure reducing capacity for certain types of pressure container, for instance superheaters) must be of the spring-loaded type. However, when it is attempted to load a valve of large capacity, such for example as is now required in connection with modern steam generating plants, the loading spring must necessarily be very heavy. Such a spring does not respond quickly to small variations in pressure and it is difficult under such circumstances, to keep the blow-down of the valve within the desired limits which, in certain cases, are precisely described by law, or to adjust such limits when circumstances so demand. This difficulty is much less apparent when the total load upon the valve is small and when a relatively light spring may be employed. For this reason it has been proposed heretofore to provide large capacity spring-loaded safety valves with much smaller pilot valves designed to control the operation of the larger valve. Such pilot operation of spring-loaded safety valves has been accomplished in various ways, but such prior constructions may be roughly divided into two principal classes. In those of the first class, the pilot valve is employed as a motor to operate lifting means designed further to increase the lift and capacity of the main valve after the latter has begun to open in response to the direct pressure of the fluid acting upon the disk of the main valve.

Thus, in devices of the first class, the casing of the spring-loaded pilot valve is usually an integral part of the main valve, or if it have a separate casing it is mounted on or closely adjacent to the casing of the main valve. The pilot valve is so arranged that when it opens it permits pressure fluid from the container to flow through a conduit into a cylinder where it acts upon a piston constituting motor means for operating a lever which acts directly or indirectly upon the spindle of the spring-loaded main valve. In the operation of such devices the rise of pressure in the container causes the main valve to lift from its seat in opposition to the main loading spring. If the pressure continue to rise after the main valve has lifted from its seat, the pilot valve (which is set to open at a pressure slightly higher than that which lifts the main valve) will open and permit steam to flow to the cylinder and thus actuate the piston which acts as a motor to lift the main valve higher from its seat, thus insuring an adequate discharge of pressure fluid. Thus in this arrangement, the full opening of the main valve is dependent upon the prior operation of the pilot valve.

In the second of these general classes, the pilot valve is usually located remotely as respects the main or unloading valve, and is so related to the latter as to control the blow down of the main valve. However, spring-loaded safety valves cannot be used in certain prior systems of pressure relief, for instance certain remote control systems.

In this arrangement, the pilot valve is set to open before the main valve. When the pilot valve opens it delivers pressure fluid from the container to a cylinder where it acts on a piston and thus initiates the lift of the main valve from its seat. The main valve will stay open only as long as the pilot valve is open, and will close immediately when the pilot valve closes. Thus the blow down of the combined valve structure is that of the pilot valve itself. While this latter arrangement is advantageous in that the blow down is controlled by the small pilot valve, whose blow down may be more readily adjusted within reasonable limits than that of a large heavily loaded valve, nevertheless it is still true that the blow down is limited within the permissive setting of the pilot valve.

A principal object of the present invention is to provide a method of and means whereby low blow down may be obtained regardless of capacity, by the use of a spring-loaded pop safety valve. A further object is to make it possible to substitute spring-loaded valves of substantially standard type for pressure-loaded valves in certain prior types of remote control systems, such for example as disclosed in the patent to Heise No. 1,809,898, dated June 16, 1931.

A further object is to provide means whereby a spring-loaded safety valve, having a normal blow-down range, may be caused automatically to open at a pressure intermediate the limits of said range but to close at the normal low limit of said range. A further object is to provide means whereby a spring-loaded safety valve, having a normal blow-down range, may be caused to open at a pressure intermediate the limits of said range and thereafter to function normally in response to drop in pressure and thus to close in the same way as an ordinary valve of the same type.

A further object is to provide pressure relief means comprising a main relief valve and a pilot valve, both valves being of the spring-loaded type, and wherein the pilot valve determines the pressure at which the main valve shall open, but does not affect the closure of the main valve.

Other and further objects and advantages of the invention will be pointed out in the following more detailed description and by reference to the accompanying drawings wherein:

Fig. 1 is a diagram illustrative of the improved action of a spring-loaded safety valve designed in accordance with the present invention;

Fig. 2 is a diagrammatic side elevation, partly in vertical section, showing a spring-loaded safety valve of conventional type provided with novel valve-controlling means in accordance with this invention;

Fig. 2a is a section, more or less diagrammatic, to larger scale, illustrating a type of pilot valve useful in the combination shown in Fig. 2;

Fig. 3 is a front elevation partly broken away and partly in vertical section, of the structure shown in Fig. 2;

Fig. 4 is a diagrammatic view showing a valve of the general form illustrated in Figs. 2 and 3 applied to a superheater in a steam generating system;

Fig. 5 is a diagram illustrative of a relative arrangement of valve blow downs in such a system as that of Fig. 4, made possible by the employment of the present invention;

Fig. 6 is a diagram generally similar to Fig. 4 but showing the employment of a pressure actuated electrical switch for initiating the opening of the spring-loaded safety valve; and Fig. 7 is a diagrammatic view, to larger scale, illustrative of the elements of a pressure-actuated switch device useful in such an arrangement as that shown in Fig. 6.

Referring to the drawings, Figs. 2, 2a and 3 illustrate one simple embodiment of the invention. In Fig. 2 the numeral 1 designates the pressure relief assembly (in accordance with the invention) mounted directly upon a pressure fluid container 2, for example a steam boiler, superheater, oil-still, compressed air tank or the like, such container having the supporting flange 3 to which is secured the flange 4 of the casing 5 of the main safety valve of the present construction. This main safety valve which forms an essential part of the relief assembly is here illustrated as furnished with a seat bushing 6 (Fig. 2) which may for example be of the kind disclosed in the patent to Graesser et al., No. 1,668,453, dated May 1, 1928. The bore of this bushing defines the throat passage 7 and the upper end of the bushing is shaped to furnish the valve seat. This bushing also carries the adjustable blow-down ring 8 which cooperates with the valve feather or head 9 to define an annular passage, when the valve feather is lifted, through which pressure fluid is discharged into the delivery chamber 10. The casing comprises the outlet portion 10a provided at its end with the flange 11 to which a discharge pipe, not shown, may be secured. The valve feather 9 is normally held against its seat by a spindle 12 extending out through the bonnet structure 13 which houses the loading spring 14 whose tension may be adjusted by the adjusting screw 15. The valve is furnished with the usual bifurcated lifting lever 16 which is pivotally supported at 17 on a bracket carried by the bonnet structure, and whose opposite arms are furnished with bosses 18 which engage diametrically opposite points of the lower spring abutment 19.

In accordance with the present invention a motor casing 20 is secured to or formed integrally with the casing 5 of the main valve. This motor casing has a cylindrical bore 21 in which slides the piston 22, the bore being closed at its upper end by a cover member 23 having a central guide opening for the stem 24 of the piston. The parts are so arranged that the upper end of this stem 24 underlies the lever 16 so that upward movement of the piston in the bore 21 swings the lever 16 upwardly, thus lifting the abutment 19 and raising the valve feather 9 from its seat.

The lower portion 21a of the bore in the casing 20 communicates by means of pipe connections 25 with the outlet 26 of a pilot valve 27. This pilot valve 27 is a spring-loaded, pop valve of any desired type. For instance, it may be substantially like the main valve, although of smaller capacity, or it may be of a general construction such as illustrated in Fig. 2a. As thus shown, the pilot valve has the casing 27 provided with the outlet 26, to which the pipe connections 25 above described are secured. The casing has the delivery chamber 29 and the seat bushing 30 which defines the inlet throat 31 leading to the valve seat and carrying the adjustable blow-down ring 32. The valve feather 33 is normally held against its seat by the loading spring 34, adjustable by means of the screw 35 carried by the bonnet structure 36. The lower end of the casing 27 is connected as indicated at 36 (Fig. 3) to the discharge of a globe valve 37 having a manually operable wheel 38 for opening and closing it, and having an inlet nipple 39 which is secured in an internally screw-threaded boss 40 integral with the casing 5. This boss 40 has a bore 41 which communicates with the inlet throat 7 of the main valve but which is preferably furnished with an orifice 42 of definite capacity. By the provision of the globe valve 37 or its equivalent, it is possible, whenever desired, to shut off the pilot valve, for example to permit it to be adjusted or repaired, without necessitating the shutting down of the boiler, the main valve continuing to function like any usual pop valve while the pilot valve is out of commission.

To facilitate an understanding of the principle involved in the operation of the construction above described, the diagram of Fig. 1 is suggestive of certain relationships between the settings of the main and pilot valves whereby the improved operation in accordance with the present invention may be obtained. Thus for example, in accordance with this diagram, the main valve is so set that if acting alone in response to fluid pressure, it would open at a pressure of 100 lbs. and close at a pressure of 96 lbs., that is with a normal blow-down range of 4 lbs. The pilot valve is set to open at a pressure of 98 lbs. (half way between the opening and closing points of the main valve) and to close normally at a pressure of 94 lbs., that is, the pilot valve alone would have a 4 lb. blow-down range.

As above noted, the pilot valve receives pressure fluid through the bore 41 and control orifice 32 from the inlet throat 7 of the main valve. Thus normally, under static conditions, the pilot valve is exposed to the maximum pressure within the container 2. Since the pilot valve is set to pop at a pressure lower than the popping pressure of the main valve, the pilot valve will open in response to rise in static pressure before the main valve opens. When the pilot valve opens, it delivers pressure fluid into the space 21a in the motor casing 20 below the piston 22, thus forcing the piston 22 upwardly and thereby lifting the lever 16 and mechanically raising the main valve from its seat and thus establishing kinetic flow. When the main valve has thus been separated from its seat, the energy of the escaping steam, acting upon the blow-down ring 8 is sufficient to move the main valve to its maximum lift instantaneously.

However, as soon as flow conditions are established through the throat 7 of the main valve, the pressure in the passage 41 and thus beneath the feather of the pilot valve immediately drops, for example as indicated in Fig. 1, to a pressure of 92 lbs. Since this is below the normal closing pressure for the pilot valve the latter immediately closes, thus no longer delivering pressure fluid to the motor 20, and thus leaving the piston 22 free to move downwardly. The lower part of the casing 20 is provided with a small leak orifice 20x for the slow discharge of pressure fluid or condensate from the chamber 21a.

Since the motor device (the piston 22 in its cylinder 20) which lifted the lever 16 is now no longer effective, the main valve is now free to act in the same way as any spring-loaded safety valve of this type, and thus will automatically close when the pressure in the container has dropped to the low limit (96 lbs.) of the blow-down range of the main valve.

Reference to Fig. 1 will show that although the normal blow-down range of the main valve is between 96 and 100 lbs. (i. e. 4 lbs.), the main valve actually opens at a 98 lbs. pressure and closes at a 96 lbs. pressure, in other words the actual blow-down range of the main valve has been reduced from 4 lbs. to 2 lbs. Thus the rated blow down of the main valve has been reduced 50%.

Since it is readily possible to adjust the spring-loaded safety valve of small capacity to have a blow down which is substantially below 4%, without danger of simmer, excessive wire drawing or the like, it is thus a practical matter by this combination to reduce the actual blow down of the main valve, even though the latter be of very large capacity, to a point well below the 4% commonly required.

Although in accordance with this invention it is thus possible to provide a very low blow down, this result is attained by the use of valves of substantially standard construction and without interfering with the ability of each valve to open freely in response to the pressure to which it is normally designed to open. It may further be noted that although two valves are employed both receive pressure fluid from the same outlet from the pressure container so that it is not necessary to provide additional outlets for the latter and thus no undesirable weakening of the container results from this new arrangement.

While the arrangement thus specifically illustrated in Figs. 2, 2a and 3 is very useful for direct mounting upon a pressure container, the invention is of broader utility and in particular in connection with pressure controlled systems in which it is desirable to control a safety valve remotely, for example to control a superheater valve in response to pressure conditions in a generator drum.

Fig. 4 illustrates the application of the improved pressure relief means to the outlet 42 of a superheater 43 receiving steam from the generator drum 44. The relief valve mechanism 1 may be identical with that above described. The generator drum may be provided with a series of safety valves in the usual manner, one of these valves 45 being shown in Fig. 4, the several valves of the series being set to have blow-down ranges whose upper limits are successively higher. Fig. 5 diagrammatically indicates, by way of example, one suitable setting of the drum valves and the valve mechanism 1. In this diagram, the lines 45b, 45c, 45d and 45e represent the blow-down ranges of the several drum valves, and indicate a lower limit of 1400 lbs. for the closing pressure of the first valve and a popping pressure of 1490 lbs. for the last valve of the series. There is always a substantial drop in pressure between the drum and the superheater outlet, and thus normally the blow-down range of the superheater valve would be adjusted substantially as indicated by the dotted line 5x in this diagram. However, by the use of the pressure relief means of the present invention the main valve on the superheater may be set to have the normal blow-down range indicated by the line 5b, as shown in the diagram, whereas the actual blow-down range of the relief assembly 1 will be as indicated by the line 27b in the same diagram. Thus although the superheater valve now opens at a pressure within the normal blow-down range (5b) of such a valve, its actual blow-down is very much less as indicated by comparison of the length of the lines 5b and 27b.

Fig. 6 illustrates pressure relief means wherein a safety valve, mounted on the superheater outlet, is remotely controlled. Thus, as illustrated, the pressure relief means comprises the main valve 5x mounted directly on the superheater outlet 42, the valve having the bonnet 13 and loading spring like the main valve above described, and having the lifting lever 16. In this instance, the lifting lever is actuated to raise the valve feather by a link 48 connected to the core of a solenoid 49 mounted on the valve bonnet. The coils of the solenoid are in series with a circuit 50 which is closed or opened by a pressure-actuated switch 51. This switch may be, for example, of the type illustrated diagrammatically in Fig. 7. As thus illustrated, the switch comprises a pressure-responsive device, for example the Bourdon tube 53 carrying a bracket 54 at its free or movable end. Preferably, this bracket is furnished with an adjustable force-applying memebr 55 designed to engage the actuating pin 56 of an electrical switch 57. This switch is preferably a snap switch and may be of the type known to the trade as a "Mu" or "Micro" switch, for example, of the general kind disclosed in the patent to Leupold No. 1,780,758, dated November 4, 1930, and as here arranged is so designed that depression of the pin 56 breaks the circuit 50. Within the switch housing there is mounted an adjustable support 58 carrying a Sylphon 59 or equivalent fluid pressure motor, having its movable end 60 opposed to an abutment surface 61 of the bracket 54, the parts being so arranged that expansion of the Sylphone causes the member 60 to engage the abutment 61 and thus force the free end of the Bourdon tube downwardly so as to break the circuit 50 at the switch 57.

The Bourdon tube is supplied with pressure fluid from the outlet 42 of the superheater (with which the inlet of valve 5x also communicates)

by means of a pipe 62, while the Sylphon 59 is supplied with pressure fluid through a conduit 63 leading from the delivery chamber of the valve 5ˣ. As illustrated, the pipe 63 is connected to the delivery nipple of the valve between the valve body and the flange to which the delivery pipe is to be connected, but in actual practice the pipe 63 is connected to the valve body and leads directly from the delivery chamber of the valve When rise in fluid pressure causes the Bourdon tube 53 to expand, the circuit 50 is closed at the switch 57, the solenoid 49 is energized, thus lifting the lever 16, and unseating the main valve. As soon as the main valve begins to blow, pressure fluid passes through the pipe 63 to the Sylphon 59, expands the latter, and thus forces the tip of the Bourdon tube downwardly, thereby breaking the circuit through the switch and de-energizing the solenoid so that thereafter the valve 5ˣ is free to close at the normal low limit of its blow-down range. However, by proper adjustment of the member 55 of the switch, the solenoid 49 may be energized at any desired pressure below the normal popping point of the main valve and thus the blow-down range of the latter may be very accurately adjusted and an exceedingly small blow-down is made possible.

Among the advantages of the improved relief mechanism above described may be mentioned the following: First, since the main valve is spring loaded it may operate independently of the pilot and thus meets the requirements of the American Society of Mechanical Engineers to the effect that safety valves, at least, for certain specific uses must be of the direct spring-loaded type; second, the improved relief means is capable of providing a blow down in the neighborhood of 1%, such low blow down being very desirable in systems working at the very high temperatures and pressures of modern steam generating plants; third, since both the main and pilot valves may be set for normal independent blow downs of between 3 and 4% it is much easier to set them and they are much more certain to operate satisfactorily than though it were attempted to set either one of them for a blow down as low as 1%; and fourth, the main valve will be tighter and require far less servicing than would a valve of large capacity if set for a low blow down.

While certain desirable embodiments of the invention and applications thereof have herein been illustrated and described by way of example, it is to be understood that the invention is not limited to such precise embodiments but is to be regarded as broadly inclusive of any and all equivalent constructions and arrangements and modes of procedure which fall within the terms of the appended claims.

I claim:

1. Pressure relief means comprising in combination a spring-loaded safety valve of the kind having a blow-down ring designed to provide a definite blow-down range, and automatically acting motor means operative to open the valve at a pressure intermedaite the limits of said range but which is so constructed and arranged as to become ineffective when the valve opens thereby leaving the valve free to close under control of its blow-down ring at the lower limit of said range.

2. Pressure relief means comprising in combination a spring-loaded safety valve of the kind wherein fluid-deflecting means provides a definite blow-down range, and motor means operative to apply force to open the valve in response to a pressure intermediate the limits of said range, and means for controlling the motor means including a pressure-responsive element, free to move wholly independently of the valve parts, in response to pressure variations, said pressure-responsive element initiating operation of the motor means, and means so constructed and arranged as to cause the motor means to become wholly ineffective immediately after the valve opens.

3. Pressure relief means comprising in combination a spring-loaded safety valve having a casing which houses a valve seat, a movable valve feather, and a blow-down ring, the valve being constructed and arranged automatically to open at a definite pressure and to close at another definite but lower pressure, and control means external to the valve casing operative to apply mechanical force sufficient to lift the valve feather from its seat at a pressure intermediate said opening and closing pressures, the control means including a pressure-responsive element free to move independently of the valve feather in response to pressure variations, the control means being so constructed and arranged as wholly to terminate the application of such valve lifting force as soon as the valve opens.

4. Pressure relief means comprising in combination a spring-loaded safety valve which has an adjustable blow-down ring designed to provide a definite blow-down range, pressure motor means responsive to the pressure which acts upon the valve, said motor means being operative to open the valve at a pressure intermediate the limits of said range, and a pressure-responsive control element free to move wholly independently of the valve in response to pressure increase and which initiates operation of the motor means, the parts being so constructed and arranged that the control element becomes wholly ineffective as soon as the valve opens and remains ineffective so long as the valve remains open.

5. Pressure relief means comprising in combination a spring-loaded safety valve comprising fluid-deflecting means designed to provide a definite blow-down range, pressure-actuated control means including a movable pressure-responsive element free to move wholly independently of the valve in response to pressure variations, said control means being constructed and arranged to respond to a pressure intermediate the limits of said range when the valve is closed and thereby to open the valve, said control means being so associated with the valve that when the valve opens the effective pressure acting on the control means is no longer sufficient to actuate it.

6. Pressure relief means comprising in combination a spring-loaded safety valve having a blow-down ring designed to provide a definite blow-down range, the valve including a lifting lever, motor means responsive to a pressure intermediate the limits of said range, said motor means including an element which is engageable with the lifting lever thereby to open the valve, the parts being so designed and arranged that the motor means becomes ineffective as soon as the valve opens thereby permitting said lifting lever to return to normal position while leaving the valve open.

7. Pressure relief means comprising a spring-loaded safety valve having a definite normal blow-down range and valve-opening means operative to initiate opening of the valve at a pressure intermediate the limits of said range, said valve-opening means including a movable pressure-responsive element which moves in one direction when exposed to a definite fluid pressure less than that normally necessary to open the valve and in the opposite direction in response to a definite but lower pressure, the valve and said element being free to move independently and so designed and arranged that neither exerts any restraint upon the movement of the other, said valve-opening means also including a motor operative in response to movement of said movable element in the first-named direction to apply force to open the valve, said element being arranged to move in the opposite direction as soon as the valve opens and thereby to cause the motor to cease functioning.

8. Pressure relief means comprising a spring-loaded safety valve of a design such that it has a definite blow-down range, and a spring-loaded pilot valve also designed to have a definite blow-down range, the pilot valve opening at a pressure less than that requisite to open the main valve and being so constructed and arranged with reference to the main valve as to initiate opening of the latter when the pilot valve blows, the parts being so constructed and arranged that the pilot valve closes immediately in response to a drop in fluid pressure resultant from the opening of the main valve.

9. Pressure relief means comprising a main spring-loaded safety valve and a spring-loaded pilot valve operative to initiate opening of the main valve, the spring loads upon the respective valves being wholly independent, the one of the other, each of said valves being designed to have a normal blow-down range, the parts being so constructed and arranged that in operation the main valve has an actual blow-down range less than the normal blow-down range of either of said valves acting alone.

10. Pressure relief means comprising a spring-loaded safety valve having a definite normal blow-down range and valve-opening means operative to initiate opening of the valve at a pressure intermediate the limits of said range, said valve-opening means including a Bourdon tube whose tip moves in one direction when the tube is exposed to a definite pressure less than that normally necessary to open the valve, the valve-opening means also including a motor operative in response to such movement of the tube tip to apply force so as to open the valve, and means operative in response to the opening of the valve positively to move the tube tip in the opposite direction thereby to cause the motor to cease functioning.

11. Pressure relief means comprising a spring-loaded safety valve having a definite normal blow-down range and valve-opening means operative to initiate opening of the valve at a pressure intermediate the limits of said range, said valve-opening means including a pressure-controlled electric switch designed to close an electrical circuit at a definite fluid pressure intermediate the limits of said range and to break the circuit at a definite but lower pressure, said valve-opening means also including an electrically actuated motor operative when said circuit is closed to open the valve, means operative to supply pressure fluid to the switch device thereby to close the circuit, and means operative, when the valve opens, to deliver pressure fluid to the switch device thereby to break the circuit.

12. Pressure relief means comprising a spring-loaded safety valve having a definite normal blow-down range and valve-opening means operative to initiate opening of the valve at a pressure intermediate the limits of said range, said valve-opening means including a Bourdon tube whose tip moves in one direction when the tube is subjected to progressively changing fluid pressure, an electrical switch which is actuated by such movement of the tube tip, an electrically energized motor operative when the switch is so actuated to open the valve, and means operative in response to opening of the valve to move the tube tip in the opposite direction thereby to cause the motor to cease functioning.

13. Pressure relief means comprising a spring-loaded safety valve having a definite normal blow-down range and valve-opening means operative to initiate opening of the valve at a pressure intermediate the limits of said range, said valve-opening means including a fluid pressure motor comprising an element which moves in one direction when the motor is subjected to a progressive change in fluid pressure, an electrical switch which is actuated by said element of the motor when it so moves, an electrically energized motor operative to open the valve when the switch is so actuated, and a pressure-responsive device, to which pressure fluid is admitted by the opening of the valve, operative to cause the motor to cease functioning.

14. Pressure relief means comprising in combination a spring-loaded safety valve including a casing having therein a movable valve head, a valve seat within the casing arranged for cooperation with the valve head, and means defining a throat passage leading to said seat, a blow-down ring cooperable with the head to determine the pressure at which the valve will normally close after opening, a loading spring which determines the pressure at which the valve head would normally lift from its seat in response to the direct throat pressure of the fluid acting against the valve head, and automatic actuating means operative to lift the valve head from its seat at a pressure intermediate said normal opening and closing pressures, said automatic actuating means including a pressure motor and being so constructed and arranged as to become wholly ineffective in response to the drop in pressure in said throat passage resultant from the lift of the valve head from the seat.

15. A spring-loaded safety valve for use on a superheater which receives pressure fluid from a generator and delivers the pressure fluid at an increased temperature, said valve including parts so constructed and arranged as to define a definite normal blow-down range, and valve-opening means operative to initiate opening of the safety valve at a pressure intermediate the limits of its normal blow-down range, said valve-opening means including an electrical switch, a pair of fluid pressure motors operative respectively to close and to open the switch, the motor which closes the switch being constructed and arranged to close the switch in response to a fluid pressure intermediate the limits of the blow-down range of the safety valve, an electric motor energized by the closing of the switch, and which, when energized, opens the valve, means providing communication between the inlet of the safety valve and that motor means which closes the switch, and means providing communication between the delivery of the safety valve and the other fluid pressure motor.

16. Method of operating a spring-loaded safety valve for relieving the pressure in a fluid container and which is constructed and arranged normally to open in response to a static fluid pressure $x$, acting beneath the valve and to close at a different fluid pressure $x-y$, which comprises as steps causing the valve to be unseated, while the fluid pressure beneath the valve is still less than $x$, but greater than $x-y$, by a force $z$ whose application is determined by the fluid pressure beneath the valve, and, as soon as the valve is unseated rendering said applied force $z$ ineffective to hold the valve unseated.

17. Method of operating a spring-loaded safety valve for relieving the pressure in a fluid container, said safety valve being constructed and arranged normally to have a blow-down of the order of 4%, whereby the valve may be opened and closed within a blow-down range of the order of 2%, said method comprising as steps causing the valve to be unseated by force exerted by pressure fluid acting beneath the valve when the pressure of said fluid reaches approximately the midpoint of the blow-down range, and as soon as the valve is unseated freeing it from said force thereby to restore the valve to its normal operation.

FRANK H. HOPKINS.